Patented Apr. 15, 1952

2,592,616

UNITED STATES PATENT OFFICE 2,592,616

PROCESS OF TREATING NYLON

Louis L. Stott, Reading, Pa., and Laurence R. B. Hervey, West Concord, Mass., assignors, by direct and mesne assignments, to The Polymer Corporation, Reading, Pa., a corporation of Pennsylvania No Drawing. Application May 26, 1949, Serial No. 95,587

12 Claims. (Cl. 260—33.4)

This invention relates to solvents for synthetic linear polyamides and to compositions of matter comprising solutions of synthetic linear polyamides.

The synthetic linear polyamides with which this invention is concerned are the type described in United States Patents Nos. 2,071,250, 2,071,253 and 2,130,948 and particularly those which are normally considered insoluble in simple alcohols. These polymers are referred to herein by the generic term nylon.

Solvents for synthetic linear polyamides are known. The normally alcohol-insoluble types such as polyhexamethylene adipamide and polyhexamethylene sebacamide may be dissolved in such solvents as phenols and strong mineral acids. Such solvents have, however, severe disadvantages.

Waste and scrap nylon are available from several sources, e. g. rejects during manufacture, turnings from the machining of solid nylon shapes, skeleton scrap resulting when parts are stamped from nylon strips, trimmings from the cutting of nylon fabrics, and used nylon cloth and articles. If this scrap and waste are absolutely clean, they can be remelted under controlled conditions and used over again, but often such material is contaminated with foreign materials such as dirt, oil, grease, or floor sweepings, or it may contain unwanted impurities such as cotton thread, delusterants, etc. This contaminating material may be removed by filtration, but none of the solvents now known is fully satisfactory for this purpose since such solvents introduce materials which are difficult to remove, or the solvents degrade the polymer unduly, or are too corrosive or are too expensive for commercial use.

An object of this invention is to prepare solutions of normally alcohol insoluble polyamides.

Another object is to prepare free-flowing solutions of polyamides with a relatively inexpensive, volatile and non-corrosive solvent which does not degrade polyamides.

These and other objects may be accomplished by dissolving the polyamides in methyl alcohol at elevated temperatures and pressures.

In carrying out this invention, temperatures considerably above the normal boiling point of methyl alcohol must be employed. The temperatures at which solution takes place range from about 152° C. for methyl alcohol solvation of polyhexamethylene adipamide, to about 170° C. for solvation of polyhexamethylene sebacamide. Provision must therefore be made for carrying out the solvation under elevated pressure conditions. Sufficient pressure may be obtained by carrying out the solvation in a closed pressure-resistant container so that when the temperature is raised the pressure automatically builds up. Sufficient pressure to allow a temperature increase up to the dissolving point may, of course, be provided in any other suitable way as by introducing into the reacting zone an inert gas such as nitrogen. This may be accomplished by introducing the gas through a valve arrangement in the reaction container.

It has been found by extensive laboratory work that pure methyl alcohol, unlike other alcohols, will dissolve the normally alcohol insoluble polyamides by the process herein described. For practical purposes solutions containing at least 1% nylon in solution are required, though greater concentrations are preferable for most industrial operations.

In order to understand our invention more clearly, the following examples are given:

Example I

Nylon chips and methyl alcohol were mixed in the ratio of 18.5 grams of nylon to 100 cc. of methyl alcohol, the air replaced by nitrogen, and sealed in a transparent container and placed in an oven. While the mixture was agitated, the temperature was raised slowly until the nylon began to dissolve (152° C.). At 163° C. the nylon completely dissolved forming a solution which was clear and flowed freely. Upon cooling the nylon precipitated out as very fine particles. The nylon used in the above experiment was hexamethylene adipamide.

Example II

Polyhexamethylene sebacamide in the form of chips was mixed with methyl alcohol in the ratio of 18.5 grams of polymer to 100 cc. of methyl alcohol. The procedure of the first example was followed. At about 170° C. all the polymer was in solution to form a clear mobile liquid. Upon cooling the solution slowly the polymer showed evidence of precipitation at 106° C. in that the mixture became turbid. At temperatures below 106° C. the polymer separates as a fine dispersion.

It will be appreciated that each polymer varies somewhat in its solubility characteristics and that the temperature of solvation will vary somewhat. The process herein described is, however, applicable to all simple linear polyamides which are normally considered insoluble in alcohols, but which are soluble in phenol. Polyamides fulfilling this description are of two types, those derived from polymerizable monoamino carboxylic acids or their amide-forming derivatives, and those derived from the reaction of suitable diamines with suitable dicarboxylic acids or amide-forming derivatives of dicarboxylic acids. On hydrolysis with mineral acids, the polyamides yield monomeric amide-forming reactants. For example, a polyamide derived from a diamine and a dibasic acid yields on hydrolysis with hydrochloric acid the dibasic acid and the diamine hydrochloride. Similarly, an amino-acid type polyamide yields an amino-acid hydrochloride.

In particular, this invention is concerned with the simple, unsubstituted polyamides, such as the polymers formed by the reaction of tetramethylene diamine with adipic acid, tetramethylene diamine with suberic acid, tetramethylene diamine with sebacic acid, hexamethylene diamine with adipic acid, hexamethylene diamine with suberic acid, hexamethylene diamine with sebacic acid, or the polymerization product of ε-caprolactum. These polymers all dissolve in phenol but not normally in alcohols. They do dissolve in methyl alcohol by the process of our invention as do interpolymers which are normally insoluble in alcohols but are soluble in phenol.

Thus our invention is concerned with only those polyamides which are not soluble in methyl alcohol at the boiling point of methyl alcohol at normal pressures, i. e., 64° C., but which are soluble in phenol.

Examples I and II were carried out using anhydrous methanol. The presence of water is not, however, deleterious and absolutely anhydrous methyl alcohol need not be employed. This invention comprehends the presence of small amounts of moisture as well as small amount of other compounds which have a tendency to lower the temperature of solvation, such as phenol and chlorinated hydrocarbon.

That the use of solvents in accordance with our process does not cause degradation of the polymer was shown by determining the intrinsic viscosity of untreated polyhexamethylene adipamide and comparing it with the intrinsic viscosity obtained after dissolving, precipitating, and washing it. For each determination of intrinsic viscosity a 0.5% solution in m-cresol was prepared and the viscosity was measured at 25° C. in a Stormer viscosimeter. Six samples of each material were run and the mean average of the values taken. Calculation of the intrinsic viscosity was made in accordance with the expression $$\log_e \frac{\lambda r}{C}$$

where $\lambda r$ = viscosity of the polymer in m-cresol (i. e. 0.5% concentration) divided by the viscosity of pure m-cresol in the same units and at the same temperature (25° C.), and C is the concentration in grams of polymer per 100 cc. of solution.

The following table reports the results obtained:

|  | Viscosity | Intrinsic Viscosity |
|---|---|---|
| Undissolved nylon | 17.0 sec. | .65 |
| Nylon precipitated from 100% methanol | 17.5 sec. | .70 |

In the examples given above the nylon has been divided in the form of chips. As in any solvation process, fine subdivision of the material to be dissolved speeds the solvation, though such division is not required.

In the recovery of waste nylon by our process, cotton threads, dirt, and other extraneous materials not soluble in methyl alcohol are easily separated from the nylon solution. This may be accomplished by thoroughly washing the waste nylon with a detergent solution, placing the waste in a sealed container with sufficient methyl alcohol, introducing an inert gas such as nitrogen, heating the mixture until it dissolves in the methyl alcohol, centrifuging the container, cooling the mixture and removing the clarified nylon. If desired, the hot solution may be passed through a filter press to remove undesirable materials. Such operations must, of course, be carried out at the pressures and temperatures required to keep the nylon in solution as hereinbefore described.

Having thus described our invention, we claim:

1. The process of dissolving synthetic linear polyamides normally soluble in phenol and normally insoluble in methyl alcohol which comprises forming a mixture consisting of said polyamide with substantially anhydrous methyl alcohol, placing said mixture in a closed oxygen-free system and heating said mixture under pressure to a temperature sufficient to dissolve said polyamide, said temperature and pressure being above the boiling point of said methyl alcohol, and cooling said solution to precipitate said polyamide, said polyamide being one which is normally soluble in phenol and normally insoluble in methyl alcohol and being one which on hydrolysis with hydrochloric acid yields material selected from the group consisting of (a) amino acid hydrochloride; and (b) mixtures of diamine hydrochloride and dibasic carboxylic acid.

2. The process of dissolving high molecular weight polyhexamethylene adipamide which comprises forming a mixture of said polyhexamethylene adipamide with substantially anhydrous methyl alcohol, placing said mixture in a closed oxygen-free system and heating said mixture under pressure to a temperature sufficient to dissolve said polyhexamethylene adipamide, said temperature being above the normal boiling point of said methyl alcohol and cooling said solution to precipitate said polyhexamethylene adipamide.

3. The process of dissolving high molecular weight polyhexamethylene sebacamide which comprises forming a mixture of said polyhexamethylene sebacamide with substantially anhydrous methyl alcohol, placing said mixture in a closed oxygen-free system and heating said mixture under pressure to a temperature sufficient to dissolve said polyhexamethylene sebacamide, said temperature being above the normal boiling point of said methyl alcohol and cooling said solution to precipitate said polyhexamethylene sebacamide.

4. The process of dissolving high molecular weight polymerized ε-aminocaprolactam which comprises forming a mixture of said polymerized ε-aminocaprolactam with substantially anhydrous methyl alcohol, placing said mixture in a closed oxygen-free system and heating said mixture under pressure to a temperature sufficient to dissolve said polymerized ε-aminocaprolactam said temperature being above the normal boiling point of said methyl alcohol and cooling said solution to precipitate said ε-aminocaprolactam.

5. The process of producing a finely divided synthetic linear polyamide which comprises forming a mixture consisting of said polyamide and substantially anhydrous methyl alcohol, placing said mixture in a closed oxygen-free system and heating said mixture under pressure to a temperature sufficient to dissolve said polyamide, said temperature being substantially above the boiling point of methyl alcohol, cooling said mixture to precipitate said polyamide in the form of finely divided particles and removing said solvent, said polyamide being one which is normally soluble in phenol and normally insoluble in methyl alcohol and being one which on hydrolysis with hydrochloric acid yields material selected from the group consisting of (a) amino acid hydrochlorides and (b) mixtures of diamine hydrochloride and dibasic carboxylic acid.

6. The process in accordance with claim 5 wherein the polyamide is polyhexamethylene adipamide.

7. The process in accordance with claim 5 wherein the polyamide is polyhexamethylene sebacamide.

8. The process in accordance with claim 5 wherein the polyamide is ε-aminocaprolactam.

9. The process of recovering nylon from nylon waste which comprises the steps of forming a mixture consisting of nylon with substantially anhydrous methyl alcohol, placing said mixture in a closed oxygen-free system and heating said mixture under pressure to a temperature sufficient to dissolve said nylon, said temperature being substantially above the boiling point of methyl alcohol, separating any undissolved matter, cooling said mixture, said steps of separating and cooling being carried out in a closed system and removing finely divided nylon, said nylon being a polyamide normally insoluble in phenol and normally insoluble in methyl alcohol and being one which on hydrolysis with hydrochloric acid yields material selected from the group consisting of (a) amino acid hydrochloride and (b) mixtures of diamine hydrochloride and dibasic carboxylic acid.

10. The process in accordance with claim 9 wherein the nylon is polyhexamethylene adipamide.

11. The process in accordance with claim 9 wherein the nylon is polyhexamethylene sebacamide.

12. The process in accordance with claim 9 wherein the nylon is ε-aminocaprolactam.

LOUIS L. STOTT.
LAURENCE R. B. HERVEY.

REFERENCES CITED

The following references are of record in the file of this patent:

UNITED STATES PATENTS

| Number | Name | Date |
|---|---|---|
| 2,359,877 | Schupp | Oct. 10, 1944 |
| 2,374,126 | Peters | Apr. 17, 1945 |